April 11, 1933.  A. T. HAMPTON  1,903,545
CURRENT MOTOR
Filed March 3, 1931
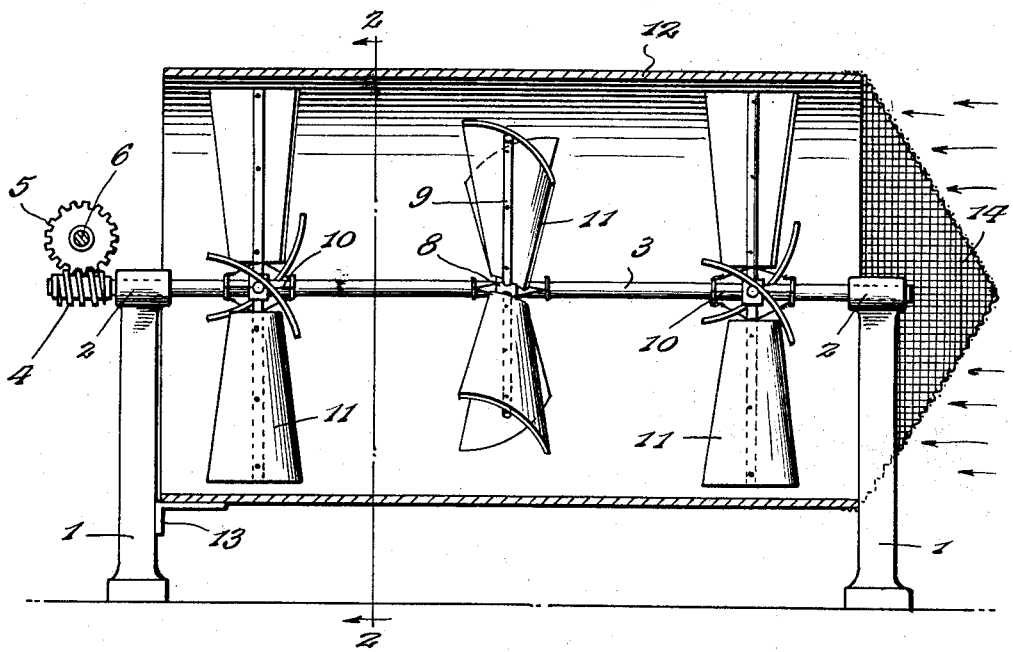
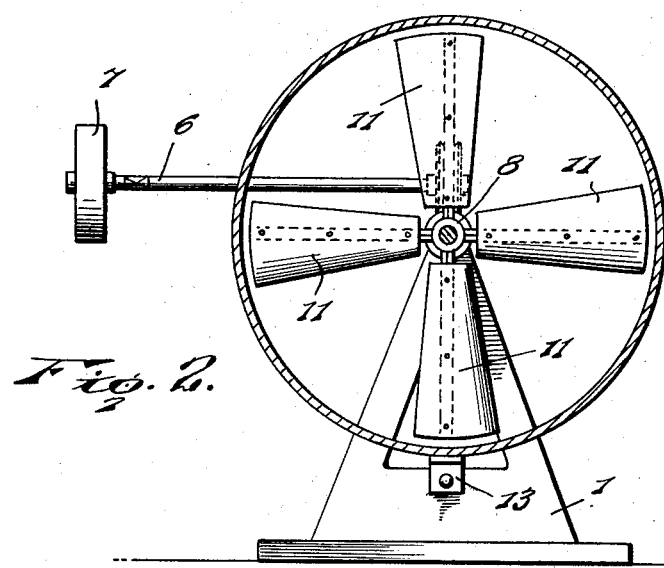
Inventor
A. T. Hampton.
By Lacey & Lacey, Attorneys Patented Apr. 11, 1933

1,903,545

UNITED STATES PATENT OFFICE

ALVAH T. HAMPTON, OF COULEE, WASHINGTON

CURRENT MOTOR

Application filed March 3, 1931. Serial No. 519,817.

The object of this invention is to provide a motor which will be actuated by flowing water and which will be of compact form and efficient in operation. The invention is illustrated in the accompanying drawing and consists in certain novel features which will be hereinafter first fully described and then more particularly defined in the appended claim.

In the drawing:

Figure 1 is a longitudinal section of a motor embodying the present invention, and Figure 2 is a transverse section on the line 2—2 of Fig. 1.

In carrying out the present invention, there is provided a supporting structure consisting of standards 1 of any approved design and of sufficient weight to firmly anchor themselves in the bed of a flowing stream. Bearings, indicated at 2, are provided at the upper ends of the standards, and in said bearings is journaled a shaft 3 upon which, at one end, preferably the downstream end, is provided a worm 4 meshing with a worm pinion 5 on a driving shaft 6 which may be extended to any desired point and carries a flywheel 7. This driving shaft 6 is, of course, connected through suitable gearing with machinery to be driven. Secured rigidly to the main propeller shaft 3 in any convenient or preferred manner are hubs 8 from which extend posts or spokes 9 which are braced by lateral stay rods 10 connected to anchoring collars secured to the shaft 3 on opposite sides of the hubs, as shown. The posts have concavo-convex vanes or blades 11 secured thereto, the convex faces of which are exposed to the force of the flowing water and which are set obliquely so that the force of the water will be exerted to impart rotation through the blades to the shaft 3 in an obvious manner. The blades are preferably segmental in shape with their inner or reduced ends disposed at substantially right angles to the posts and spaced from the hubs so that they will be more readily deflected by the current and will easily clear the water as they pass downwardly into the path of the same. The shaft 3 and the several blades are housed by a cylinder 12 of any suitable material, supported by the standards 1 in any preferred manner, as by being connected therewith through brackets 13. The downstream end of the cylinder is open, as shown in Fig. 1, while the upstream end is provided with a screen guard 14, preferably of conical form, so that driftwood cannot enter the cylinder to impede the action of the motor or damage the blades. This guard also prevents the entrance of fish into the cylinder to impede the action of the motor.

It will be readily seen that I have provided an exceedingly simple and compact motor which will operate efficiently to produce power at a very low cost. The apparatus may be set up in any stream having sufficient depth and in which there is a flow of any appreciable extent.

Having thus described the invention, I claim:

A current motor comprising spaced standards having their upper ends provided with horizontally alined bearings, a horizontal shaft mounted for rotation in said bearings, gearing for taking off power from one end of the shaft, spaced hubs rigidly secured to the shaft, spokes radiating from the hubs, anchoring collars disposed on opposite sides of the hubs, substantially segmental shaped concavo-convex blades secured to the spokes and having their inner ends disposed at substantially right angles to the longitudinal axes of the spokes and spaced from the hubs, stay rods secured to the anchoring collars and connected with the spokes between the inner ends of the blades and said hubs, the convex faces of the blades being presented to the inflowing stream, a cylindrical housing secured to the standards and encircling the shaft and blades, and a reticulated conical screen forming a closure for the housing at the upstream end of said housing.

In testimony whereof I affix my signature.

ALVAH T. HAMPTON. [L. S.]